United States Patent [19]

Arnold

[11] Patent Number: 5,326,411
[45] Date of Patent: Jul. 5, 1994

[54] METHOD FOR MAKING BELTING WITH INCREASED EDGE MODULUS

[75] Inventor: Dale B. Arnold, Anthony, Kans.

[73] Assignee: Morrison Company, Inc., Anthony, Kans.

[21] Appl. No.: 74,742

[22] Filed: Jun. 10, 1993

Related U.S. Application Data

[63] Continuation-in-part of Ser. No. 77,792, Oct. 17, 1991, Pat. No. 5,244,083.

[51] Int. Cl.⁵ .............................................. B29C 47/02
[52] U.S. Cl. ..................................... 156/137; 156/216; 156/223; 156/226; 156/227; 156/244.11; 156/244.12; 156/244.24; 156/250; 156/256; 156/258; 198/817; 198/844.2; 198/847
[58] Field of Search ............... 156/137, 216, 223, 226, 156/227, 244.11, 244.12, 244.24, 250, 256, 258; 198/844.2, 847, 817

[56] References Cited

U.S. PATENT DOCUMENTS

| | | | |
|---|---|---|---|
| 676,565 | 6/1901 | Lindsay | 198/847 |
| 722,039 | 3/1903 | Plummer | 198/847 |
| 756,548 | 4/1904 | White | 198/847 |
| 975,560 | 11/1910 | Metzler | 198/847 |
| 1,201,406 | 10/1916 | Welton et al. | 156/216 |
| 1,698,035 | 1/1929 | Tobey | 198/847 |
| 1,781,750 | 11/1930 | Dodge et al. | 198/847 |
| 2,646,161 | 7/1953 | Lorig | 198/847 |
| 2,696,865 | 12/1954 | Seiler | 156/244.12 |
| 2,757,709 | 8/1956 | Crabbe et al. | 156/137 |
| 3,144,930 | 8/1964 | Michels | 198/847 |
| 3,193,425 | 7/1965 | Holdsworth | 156/137 |
| 3,556,892 | 1/1971 | Hilliard | 156/137 |
| 4,034,617 | 7/1977 | Guyer | 198/844.2 |
| 4,279,676 | 7/1981 | Morrison et al. | 156/159 |
| 4,361,456 | 11/1982 | Reschke | 156/137 |
| 4,371,580 | 2/1983 | Morrison et al. | 428/250 |
| 4,900,609 | 2/1990 | Arnold | 428/163 |

FOREIGN PATENT DOCUMENTS 375261  12/1930  United Kingdom ............... 156/137

Primary Examiner—Caleb Weston
Attorney, Agent, or Firm—Arnold, White & Durkee

[57] ABSTRACT

Belts used in agricultural applications and particularly in round, hay balers have inherent problems created by their predominant process of manufacture. This process often involves cutting a large processed sheet of material into the narrow strips which form the core of the belt. The method disclosed herein produces a belt with a folded edge, a fabric wrapped edge, or an edge that is reinforced with a hard elastomer. These belts have strengthened longitudinal edges and an increased cross-sectional modulus at the edges which alleviates many problems associated with current hay-baler belts.

62 Claims, 5 Drawing Sheets

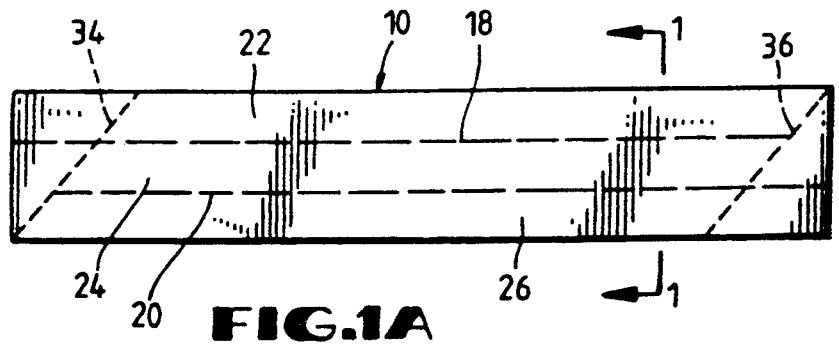
FIG.1A  FIG.1B
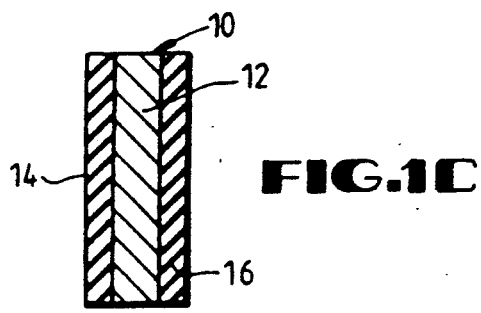
FIG.1C
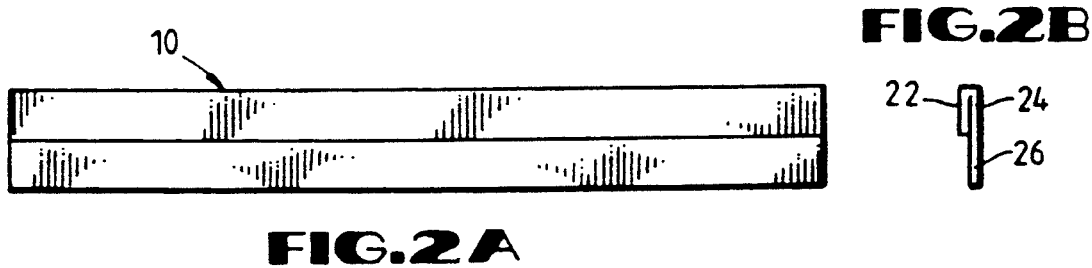
FIG.2A  FIG.2B
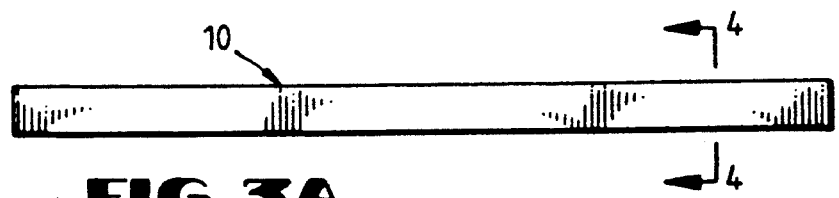
FIG.3A
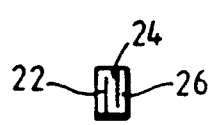  
FIG.3B  FIG.3C

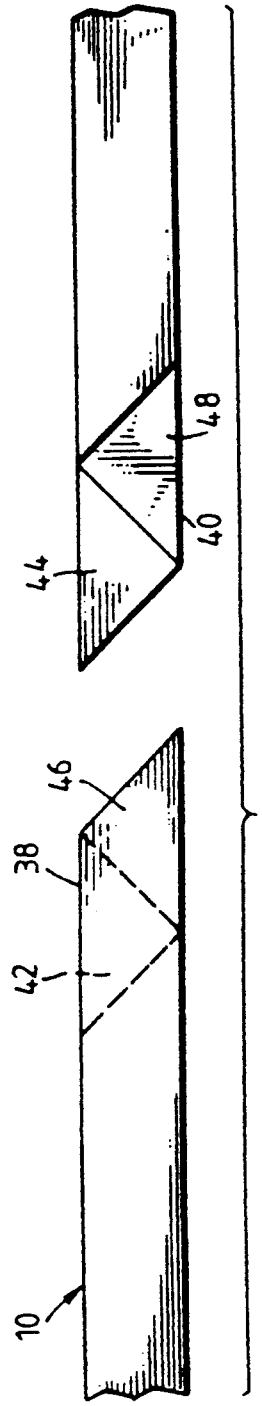
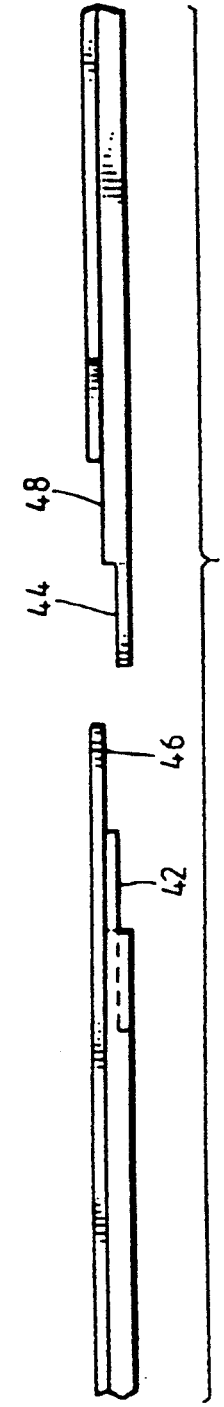
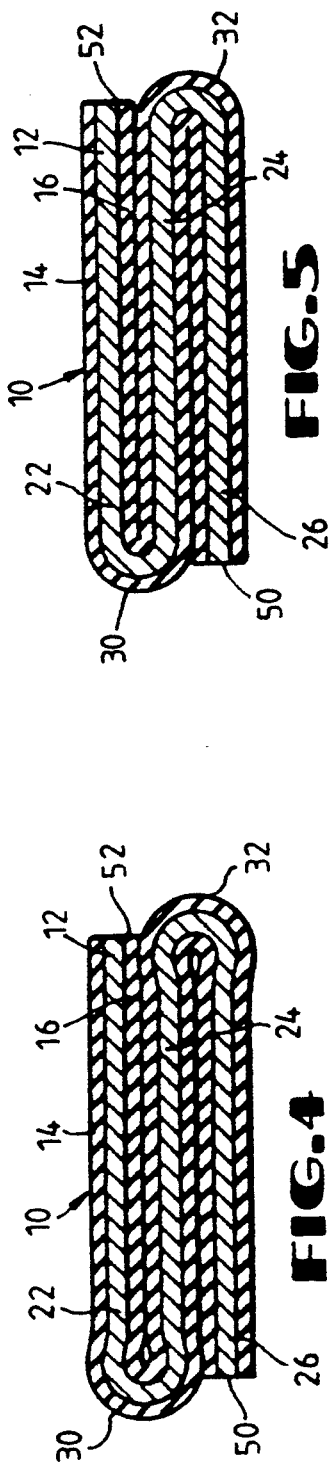

METHOD FOR MAKING BELTING WITH INCREASED EDGE MODULUS

The present invention is a continuation-in-part of Ser. No. 07/77,792 for FOLDED-EDGE BELT AND METHOD FOR MAKING SAME filed Oct. 17, 1991, incorporated herein by reference, and now U.S. Pat. No. 5,244,083.

BACKGROUND OF THE INVENTION

The present invention relates to a method of making belting and, more particularly, to a method of making belting useful in round, hay balers.

In agricultural applications, belts are used for a wide variety of purposes, from transmitting power to conveying produce. For example, hay balers use belts to form hay into a bale. In a typical round, hay baler, eight to fifteen rollers support four to eight individual belts, each of which is typically about 40 feet long.

Rigorous demands are placed on belts used in round, hay balers. The belts serve not only as conveying media, but also as size restrictors and compaction devices. This rigorous service is in sharp contrast to the service performed by the more prevalent conveyor belt. The conveyor belt is generally limited to service as a carrying and actuating medium.

The most common type of belt used in hay balers today is a three-ply belt, such as the belt disclosed in U.S. Pat. No. 4,371,580 (Morrison et al.). The belt typically is comprised of three fabric plies coupled by two inner rubber skims that form the belt core and two outer rubber skims that protect the core surfaces. A brief description of the three-ply belt's conventional manufacturing technique is in order. First, large sheets of fabric for the center ply and the outer plies are primed with a bonding chemical such as resorcinol formaldehyde latex (RFL). Uncured inner rubber skims and outer rubber covers are then alternated with the fabric sheets. The plied sheets are then vulcanized to form the appropriate bonds, and the belts are cut to the appropriate lengths and widths from the large three-ply sheet.

The most common method of belt production from large processed sheets such as the three-ply sheet mentioned above is the 'cut-edge' belt method. The belts are produced by slitting the large sheets of processed material into individual belts of the proper width. This exposes the edges of the fabric plies that form the core of the belt. The belt ends of the individual belts are then fastened together to produce continuous, cut-edge, loop belts. While these loop belts have been well received, they are not without problems.

A first such problem lies in the fact that the longitudinal edges of the belts produced by the cut-edge method tend to delaminate when the belts are subjected to the loads and stresses of a hay-baling operation. This delamination along-the longitudinal edges contributes to deterioration of the means used to fasten the ends of the belt together, especially along the longitudinal edges.

A second problem with cut-edge belting is caused by uneven infeeding of the crop into the baler. The crop pushes material into the side of the belt which tends to force the belt off a straight path of travel. This causes the edges of the belt to wear excessively, and the wear becomes progressively worse with use.

Moreover, the edges of cut-edge belts and other types of belts tend to curl up against the mechanical guides on the rollers. This curling induces an even greater amount of stress and flexion at the edges of the belt and, thus, contributes to accelerated fatigue at the edges of the belt.

A common problem with all current hay baler belts results from the heavy loads they are subjected to as they travel around the rollers when baling. The belt edges tend to stretch more than the center of the belt. This is due, at least partially, to an unbalance of load or force dissipation as the load shifts off the belt's center. This unbalanced load results from the gaps between the belts in the hay baler. When the belts are acting as compressors on the hay bale, the hay tends to bulge out between the gaps resulting in greater stress on the edges of the belt and thus greater elongation.

Another common problem with available belting is belt rollover. Current belts deform along the leading edge of a sideward moving belt. This deformation tends to brake the belt along the leading edge which causes the leading edge to roll under and the rest of the belt to roll over this leading edge. This rollover results in detrimental elongation of the belt edge which interferes with proper baler operation and contributes to deterioration of the belt.

The current methods of attaching belt ends to form continuous loop belts also create problems within the belts. The ends of cut-edge and other belts are typically joined by one of two methods. In a first method, mechanical fasteners are used to join the ends of each belt to form an endless belt. A commonly used mechanical fastener known as a "clipper lace" splice is described in U.S. Pat. No. 4,371,580 (Morrison et al.), incorporated herein by reference. A clipper lace splice includes a plurality of metal eyelets that are connected to each end of the belt. When the eyelets on each end of the belt are aligned with one another, a rod or other suitable retaining material is passed through the eyelets. The ends of the rod are suitably formed to prevent removal of the rod so that the splice remains intact.

The mechanical fasteners tend to deteriorate belts in several ways. First, the mechanical fasteners tend to wear and fail at a faster rate along the longitudinal edges of the belts because of the force exerted on the belt edge by the hay bales. If a mechanical fastener on a hay baler fails, the belt must be replaced before the hay baler can continue operating.

Second, because of the excessive wear on the outer-edge fasteners, they are damaged and effectively lost. This damage puts the central fasteners under greater tension which, in turn, can cause damage to these fasteners.

U.S. Pat. No. 4,279,676 (Morrison et al.), incorporated herein by reference, discloses a second method for joining the ends of cut-edge and other belts. This method solves some of the retention problems associated with mechanical fasteners by splicing the ends of the belt to form an endless loop. While the endless splice has proven successful in improving the reliability of the fastened belt, the increased cost of the endless splice has slowed its acceptance in the industry.

While belts have been improved over the years to minimize or overcome various problems, no known belt satisfactorily minimizes or overcomes the problems mentioned above. Two-ply belts, where the plies are made of a polyamide fabric, such as Nylon (a trademark of DuPont), exhibit excellent flexing characteristics, but also possess a relatively high modulus. In an effort to solve the elongation problem, a two-ply belt was developed where the plies were made of a rayon material.

Rayon has a lower modulus than a polyamide fabric and, hence, does not stretch as much as a polyamide belt under the same load. However, the rayon belt proved to be unacceptable, since rayon is particularly susceptible to environmental deterioration caused by moisture. In another attempt to solve the elongation problem, a two-ply belt was developed where the plies were made of a polyester material. This belt proved ineffective since the polyester plies tended to crack when flexed, and the cracking was most pronounced in the area of the mechanical fastener.

A subsequently developed three-ply belt exhibited improved flexing and stretching characteristics as compared with the above-mentioned two-ply belts. The center ply was a polyester fabric, and each outer ply was a polyamide fabric. Interposed between the center ply and each outer ply was a rubber skim. These materials were bonded together, and a rubber cover was bonded to each outer ply to provide abrasion protection for the belt and to give the machinery on which the belt was used a surface to engage when the belt was in operation.

One suggested solution for several of the problems associated with cut-edge belts and mechanical fasteners has been to put a rubber cap on the exposed edges of the belts. This solution was described in U.S. Pat. Nos. 4,900,609 (Arnold) and 4,371,580 (Morrison et al.). This rubber cap has consisted of the same material used on the outer surfaces of the belt. The cap has helped slow down wear on the inner, fabric plies that were exposed in cut-edge belts. It has also provided shock resistance for the mechanical fasteners such as when the belt comes into contact with the mechanical guides.

SUMMARY OF THE INVENTION

The present invention is directed at reducing or overcoming belting problems faced by the industry, especially the problems set forth above. The invention is based in part on the reasons for these problems. Thus, the problems have been found to be due in large part to a uniform, cross-sectional modulus of elasticity that exists between the belt edges and also to the cut edges of the belts. It has further been observed that, with usage, a cut-edge belt experiences a decrease in its cross-sectional modulus of elasticity from the longitudinal centerline of the belt outward to each edge. This decrease, it has been discovered, tends to occur when the load on the belt shifts off the centerline, thereby causing an unbalance of load or force dissipation. The resulting decrease in the cross-sectional modulus accelerates deterioration of the belt.

Studies of various belt designs helped to identify and confirm the above observations and conclusions. The studies also led to the present invention in the form of belting which has rigid or buttressed edges. These rigid edges cause an increase in the cross-sectional modulus of elasticity of the edge region relative to the central portions of the belt. Preferably, the buttressing also seals the edges so as to protect the belting from moisture, dirt, oxidation and the like.

Thus, the present invention provides belting which exhibits superior transverse impact strength, greatly decreases the incidence of belt roll over, inhibits deterioration due to strain and stress, inhibits elongation of belt edges, and resists deformation when moving sideward along the face of a rotating roller. The belting is particularly useful in agricultural applications and especially in round, hay balers.

In accordance with one aspect of the present invention, there is provided a method for making a multi-ply belt for use in hay baling. The method includes the step of coating a fabric sheet with an elastomeric material to form a coated fabric sheet. The coated fabric sheet is folded onto itself a predetermined number of times along preselected imaginary lines to form a multi-ply belt. The elastomeric material is cured and the multi-ply belt is formed into an endless belt.

In accordance with another aspect of the present invention, the endless belt is formed by forming the ends of the coated fabric sheet at a predetermined angle with respect to the imaginary lines, so that the folding forms complimentary end portions on the multi-ply belt. Thus, the complimentary end portions may be joined together to form a multi-ply splice.

In accordance with yet another aspect of the invention, a method is provided for making a belt with buttressed edges that cause the buttressed regions of the completed belt to have a higher modulus of elasticity than the center of the completed belt.

In one preferred embodiment of this aspect of the invention, a belt is formed with buttressed edges that comprise edge wraps or separate fabric strips which are wrapped around the outer, longitudinal edges of a belt core. This additional fabric increases the rigidity of the edges which causes the modulus of the completed belt to be greater in the wrapped region. The belt core and edge wrap are then covered by an elastomer that protects the core and aids in the baling operation. This increase in fabric mass along the edges of the belt aids in maintaining mechanical fastener reliability. It also reinforces an endless belt's overlap of fabric in the splice region. Furthermore, the additional fabric has reduced the elongation of the wrapped region by about 200 percent over previous belts.

In another preferred embodiment, the belt is formed with buttressed edges that comprise elastomeric caps. The belt core is encapsulated with an elastomeric cover that causes the edge region of the belt to have a higher modulus than the center region. This change in modulus is caused by covering the edge region with a harder elastomer than that used to cover the central region of the belt core. This process makes the edge of the belt more rigid relative to the center which helps to prevent excessive wear on a belt edge. The higher modulus elastomer also tends to be more abrasive resistant, thereby lasting longer and helping to prevent slippage along the belt rollers. Thus, the belt is less likely to rub against the mechanical guides. The cap also helps to protect the belt core fabric that is otherwise exposed in cut-edge belting.

In yet another preferred embodiment, a belt is formed with the buttressed edges that comprise strips of fabric and elastomeric caps. This embodiment combines both embodiments described immediately above resulting in a belt with edge wrap and a dual elastomer encapsulation.

It has been found that the increased modulus of the outer edges or edge regions of a belt improves performance by reducing the tendency of the belt to flip or roll over and also by facilitating the sideward slippage along any given roller surface. The increased modulus further counteracts the negative effects of stress and strain along the belt edges that otherwise tend to deteriorate the belt. The stiffer edges also help to protect the fastening system used to join the belt ends.

BRIEF DESCRIPTION OF THE DRAWINGS

The foregoing and other advantages of the invention will become apparent upon reading the following detailed description and upon reference to the drawings in which:

FIG. 1A is a top view of an unfolded belt in accordance with the present invention;

FIG. 1B is an end view of the belt illustrated in FIG. 1A;

FIG. 1C is an enlarged, detailed cross-sectional illustration of the belt of FIG. 1A taken along line 1—1;

FIG. 2A is a top view of the belt illustrated in FIG. 1A after having been folded once;

FIG. 2B is an end view of the belt illustrated in FIG. 2A;

FIG. 3A is a top view of the belt illustrated in FIG. 1A after having been folded twice;

FIG. 3B is an end view of the belt illustrated in FIG. 3A;

FIG. 3C is a side, end view of an alternative form of the belt illustrated in FIG. 3A;

FIG. 4 is an enlarged, detailed, cross-sectional illustration of the belt of FIG. 3A taken along line 4—4;

FIG. 5 illustrates the cross-section of the belt illustrated in FIG. 4 after being exposed to a curing process;

FIG. 6A is a top view of two ends of a belt folded in accordance with the present invention;

FIG. 6B is a side view of the two ends of the belt illustrated in FIG. 4;

Figure 7A:
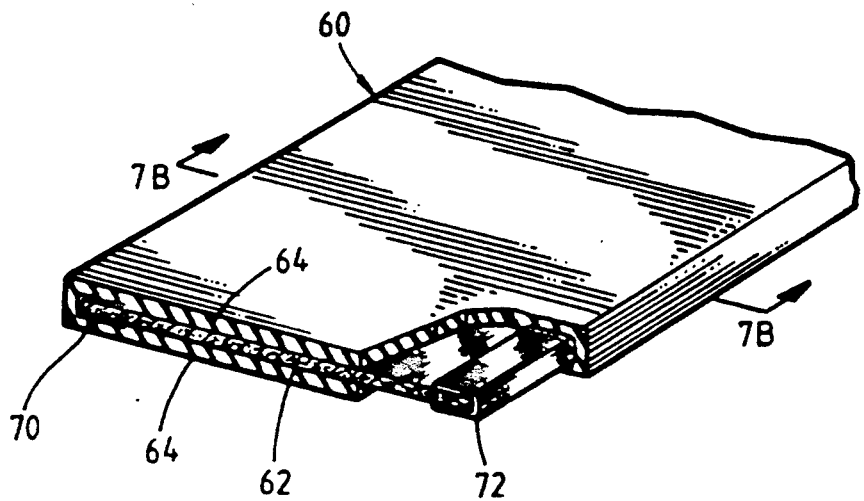
FIG. 7A is a perspective, sectional, partially cutaway view of edge-wrapped belting in accordance with the present invention.

While the invention is susceptible to various modifications and alternative forms, specific embodiments have been shown by way of example in the drawings and will be described in more detail herein. However, it should be understood that the invention is not intended to be limited to the particular forms disclosed. Rather, the invention is to cover all modifications, equivalents and alternatives falling within the spirit and scope of the invention as defined by the appended claims.

DESCRIPTION OF THE PREFERRED EMBODIMENTS

Turning now to the drawings and referring initially to FIGS. 1A, 1B, and 1C, an unfolded belt is illustrated and generally designated by a reference numeral 10. The belt 10 includes a base sheet or core 12. The core 12 of the belt 10 is preferably a reinforcing fabric sheet. For example, the fabric may be made from cotton, polyester, rayon, polyethylene, polyamides such as Nylon, aramids such as Kevlar (a registered mark of DuPont), or any suitable combination thereof.

The fabric core 12 is typically a woven sheet that exhibits a square weave or a triaxial weave. In a square weave, the longitudinal fibers of the fabric core 12 are at an angle of 90° with respect to the transverse fibers of the fabric core 12. In a triaxial weave, on the other hand, the longitudinal fibers of the fabric core 12 are at an angle of less than, or greater than, 90° with respect to the transverse fibers of the fabric core 12. In a preferred embodiment, the fabric core 12 exhibits a square weave where polyester fibers extend longitudinally along the length of the core 12 and where Nylon fibers extend transversely. The longitudinal polyester fibers make the fabric core 12 strong and resistant to stretching, while the transverse Nylon fibers allow the fabric core 12 to flex without cracking.

The fabric core 12 is usually treated with an adhesion promoter, such as resorcinol formaldehyde latex (RFL). While adhesion promoters are typically used to provide a primary chemical adhesion between different plies of a multi-ply belt, it will become apparent during the subsequent discussion that the adhesion promoter may promote adhesion between one portion of the belt 10 and another portion of the belt 10 when it is folded.

After the fabric core 12 has been treated with an adhesion promoter, the fabric core 12 is coated with a polymeric or elastomeric material on each side thereof. The coating material is illustrated in FIG. 1C as layers designated by reference numerals 14 and 16. The preferred coating material is styrenebutadiene rubber, commonly referred to as synthetic rubber. However, other coating materials, such as viapreme, polybutadiene, or natural rubber, could be used to form the layers 14 and 16.

The coating material may be applied in a variety of ways. Preferably, a sheet of the coating material is extruded through a crosshead onto each side of the fabric core 12. The crosshead extrusion process involves running the fabric core 12 through a pressure point and forcing the heated coating material into and completely around the fabric core 12. Alternatively, layers 14 and 16 of the coating material may be applied to the fabric core 12 using a straight extruder. Further, the coating material may be applied using a calendering process. Basically, the calendering process includes sandwiching the fabric core 12 between the layers 14 and 16 of coating material, and, then, curing the coating material. If the coating material is a thermal fed polymer or rubber, a vulcanization process will cure the coating material. The vulcanization process typically involves heating the coating material to a preselected temperature for a preselected length of time, as is well known in the art. However, if the coating material belongs to another group of polymers, such as thermoplastics, only a catalyzation or hardening process is required to cure the material. This process may include heating the material up to a preselected temperature and then immediately cooling it using a squelching process.

In contrast to the extrusion and calendering processes which increase the overall gauge of the belt 10, a frictioning process may be used to apply the coating material to the fabric core 12. Using the frictioning process, a very small amount of coating material is wiped onto the surfaces of the fabric core 12. Frictioning rarely increases the overall gauge of the fabric core 12 by any appreciable amount. Therefore, since the coating material adds strength and resilience to the belt 10, the extrusion or calendering processes are preferred.

Once the coating material 14 and 16 has been applied to the fabric core 12, the one-ply belt 10 is folded to form a multi-ply belt, as illustrated in FIG. 3A. In other words, the belt illustrated in FIG. 1A is a one-ply belt that will be transformed into a multi-ply belt using a folding process. The following discussion will describe a folding process where the belt 10 is folded twice to form a three-ply belt, but it should be understood that a belt having fewer or more plies may be formed using this type of folding process. However, in this case, if a 7-inch wide belt is desired for use on a hay baler, the width of the belt 10 illustrated in FIG. 1A would be about 21 inches.

The dashed lines 18 and 20 in FIG. 1A designate the locations of the two folds. As illustrated in FIG. 2A, one longitudinal edge portion 22 of the belt 10 is folded onto a central portion 24 of the belt 10. FIGS. 3A and 3B illustrate the belt 10 after the other longitudinal edge portion 26 is folded onto the central portion 24 to form an S-shaped fold. Alternatively, as illustrated in FIG. 3C, the longitudinal edge portion 26 may be folded onto the other longitudinal edge portion 22 to form a G-shaped fold.

Preferably, the folding process is performed before the coating material has been cured by vulcanization or by another appropriate process. If the layers 14 and 16 of coating material are rubber, for instance, and the rubber has been extruded onto the fabric core 12, the belt 10 is advantageously folded into a three-ply arrangement while the rubber is still hot from the extrusion process. The rubber, being hot, has a great tendency to stick to itself when folded. However, even if the belt 10 is not folded into the three-ply arrangement until the rubber coating material is cool, raw rubber has a certain tackiness to it, so it will probably stick together even when cool.

Taking the above example, after the rubber-coated belt 10 has been folded to form a three-ply belt, it is placed into a fixed mold or into a rotary mold (not shown) where the rubber is cured. In a fixed mold, the belt 10 will be cured a section at a time, assuming that the belt 10 is longer than the mold. When one section is cured, the mold is opened and the belt 10 is advanced so that the next section may be cured. Using the rotary mold, on the other hand, the belt 10 may be continuously cured as the belt 10 circumnavigates the rotary mold. The speed at which the belt 10 travels through the rotary mold is controlled so that the rubber coating material along the entire length of the belt 10 is properly vulcanized.

Regardless of what type of mold is used to cure the rubber, it should be understood that the heat applied by the mold allows the rubber to flow into and around the multiple plies of the folded belt 10 to produce a belt having a uniform cross-section. This result of the vulcanization process may be readily visualized by referring to FIGS. 4 and 5. FIG. 4, which may be thought of as an enlarged, detailed view of FIG. 3B, illustrates a cross-sectional area of an S-shaped folded belt 10. The belt 10 illustrated in FIG. 4 has been folded but has not been subjected to the vulcanization process described above. It should be noticed that the two-ply areas near the folded edges 30 and 32 appear to be somewhat higher than the two-ply areas formed between the portions 22 and 24 or the portions 24 and 26 near the center of the belt 10. Since the layers 14 and 16 of the coating material are applied in a uniform width on each side of the fabric core 12, the coating material tends to "bunch up" on the radially inner portions of the folded edges 30 and 32, resulting in the increased thickness at the longitudinal edges of the belt 10.

FIG. 5 illustrates the belt 10 of FIG. 4 after it has undergone the vulcanization process. In FIG. 5 it should be noticed that the areas of the belt 10 near the folded edges 30 and 32 are no longer thicker than the more centralized portions of the belt 10. The heat applied to the belt 10 during the vulcanization process causes the rubber coating material to flow into areas of the mold cavity that have the least pressure differential. Thus, since the pressure of the coating material in the radially inner edges of the folds 30 and 32 is at a relatively high pressure, the rubber coating material flows from these areas to areas of lower pressure, such as areas within the fabric core 12 or more centralized areas of the belt 10. As a result of the vulcanization process, the belt 10 emerges with a cross-section having substantially the same thickness from one longitudinal edge to the other.

Before, during, or after the curing process, the belt 10 may be cut to its desired length, and prepared for endless fastening. Preferably, before the belt 10 is folded, the ends of the belt 10 are cut at 45° angles as illustrated by the dashed lines 34 and 36 in FIG. 1A. Once the belt 10 has been folded into the S-shaped configuration, the opposing ends of the belt 10 resemble the end portions 38 and 40 illustrated in FIGS. 6A and 6B. As can be seen, when the belt is cut and folded in this manner, the end portions 38 and 40 complement one another in that they fit together almost perfectly to form a substantially uninterrupted endless three-ply belt. When the end portions 38 and 40 are joined, the triangular area 42 is coupled to the complementary triangular area 44, and the triangular area 46 is coupled to the complementary triangular area 48.

The end portions 38 and 40 may be joined together in a variety of ways. First, the end portions 38 and 40 may be joined together after a cushioned gum stock or a bonding gum rubber has been placed between them. Either of these materials serves as an adhesive that melts and holds the ends 38 and 40 of the belt 10 together as a result of the curing or vulcanization process. These materials may be applied to the coating material on the triangular portions 42, 44, 46, and 48, or the coating material may be scraped off and replaced by these materials. Second, the end portions 38 and 40 of the belt 10 may be sewn together in preparation for bonding during the normal vulcanization or curing process. Third, the end portions 38 and 40 may be bonded together after the curing process, using a cold bonding agent, such as rubber contact cement which is available from a number of vendors including CRP of Germany. Fourth, the end portions 38 and 40 may be joined using appropriate mechanical fasteners.

It has been found that this folding process reinforces the longitudinal edges of the belt 10 by eliminating the cut edges found in previous belts. The longitudinal edges of the folded-edge belt 10 do not tend to delaminate nearly as quickly as the cut edges because (1) the folded edges have a folded portion of the fabric core 12 holding the two plies together, and (2) the edge portions 50 and 52 at the longitudinal edges of the belt 10, which are not reinforced by a fabric fold, have not been weakened by a cutting process. Furthermore, the folded-edge belt 10 produces little waste since the belt 10 is not formed using a longitudinal cutting operation.

It has been found that the folded, reinforced, longitudinal edges of the folded-edge belt 10 increases the tensile breaking strength of the longitudinal edges by a minimum factor of three as compared with a similar belt having cut-edges. It has also been found that the transverse stiffness of the folded-edge belt 10 is also increased so that the folded-edge belt 10 offers better resistance to edge curling. Moreover, the folded-edge belt 10 has a much higher modulus than a cut-edge belt manufactured with the same materials.

Figure 7B:
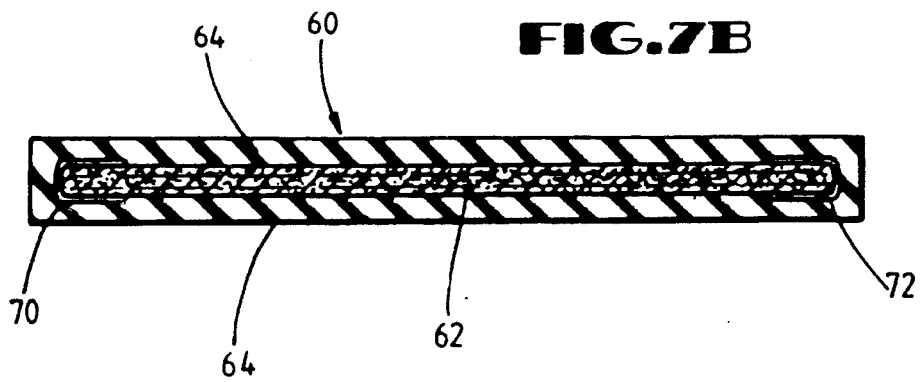
FIG. 7B is a cross-sectional view of the belt illustrated in FIG. 7A.

FIGS. 7A and 7B illustrate belting 60 in accordance with the present invention. As shown, the belting 60 includes a belt core 62 which may be of many types but which typically has a uniform, cross-sectional modulus of elasticity across the width of the belt core. A belt core is commonly made of one or more strips of fabric. These strips are normally calendered with an elastomer and plied together if a multiple fabric-ply belt is to be made. Alternatively, the belt core 62 may comprise a thermoplastic material which includes a fabric coated with a plastisol. The belt core 62 may also be extruded with a power thermoset material or thermoplastic material.

Presently, the most common type of belt core is the three-ply cut-edge belt core like that disclosed in U.S. Pat. No. 4,900,609 (Arnold). The present invention has been found to be very beneficial when used with such belt cores. The belt core may also comprise the folded-edge belt processed by the method discussed above.

The belt 60 is made by wrapping the longitudinal edges of the belt core 62 with pieces of fabric, preferably in the form of edge wraps 70 and 72. This is preferably done by applying an adhesive to the edge wraps 70 and 72 and positioning the edge wraps 70 and 72 with direct pressure. A belt with edge wraps that cover up to about forty percent of the entire belt core's opposing flat surfaces has been found to be economically efficient while still exhibiting the desired characteristics of the present invention. It should be noted that at least a portion of the center of the belt needs to have the lower modulus of elasticity to aid the baler in driving the belts.

Preferred edge-wrap materials have been found to be similar to materials used for bead wrap in the tire industry to reinforce the bead of a tire. The materials are preferably fabrics made of fibers such as polyesters, polyvinyl acetate, fiberglass, and polyamids such as Nylon or aramids such as Kevlar. The edge wrap material is preferably treated with an adhesive that will bond to the elastomer used to bond the fabric plies together. RFL has been found to be very effective when the fabric core is made of thermoplastic fibers. Silane adhesives have similarly been found to be especially effective when the fabric core is made of glass fibers.

The edge wraps 70 and 72 may be made of woven or nonwoven fabrics of the same fibers and adhesives listed above. Woven fabrics are preferred, especially with an open weave. Leno-type, woven fiberglass fabrics are especially contemplated. If the roller diameters are in excess of 3.0-3.5 inches, the edge wrap 70 and 72 may even be an adhesive-treated, woven metal cloth.

After the belt core 62 has been buttressed with edge wraps 70 and 72, it is then subjected to another plying process where an outer cover 64 of the same or different elastomer used in the belt core 62 is applied to protect the inner fabric belt core 62. The outer cover 64 is preferably applied by crosshead extrusion.

Figure 8A:
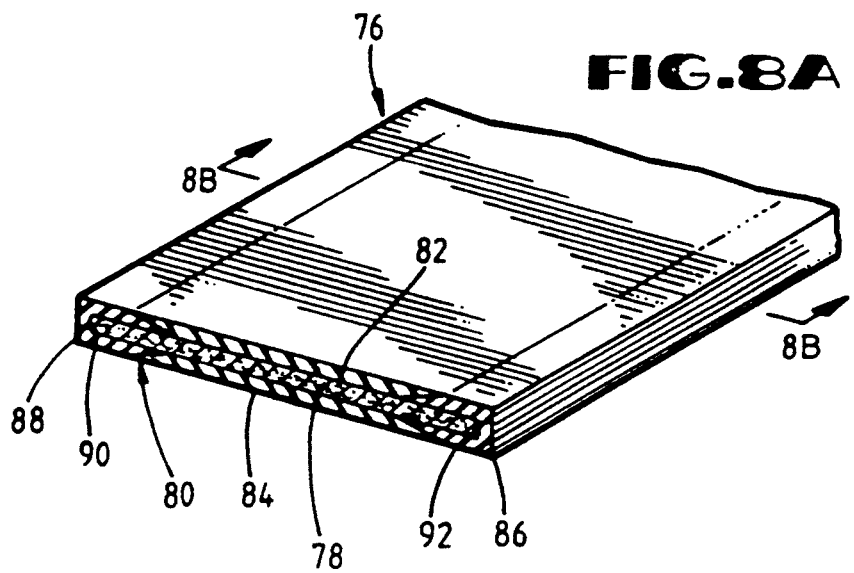
FIG. 8A is a perspective, sectional, partially cutaway view of encapsulated belting in accordance with the present invention.
Figure 8B:
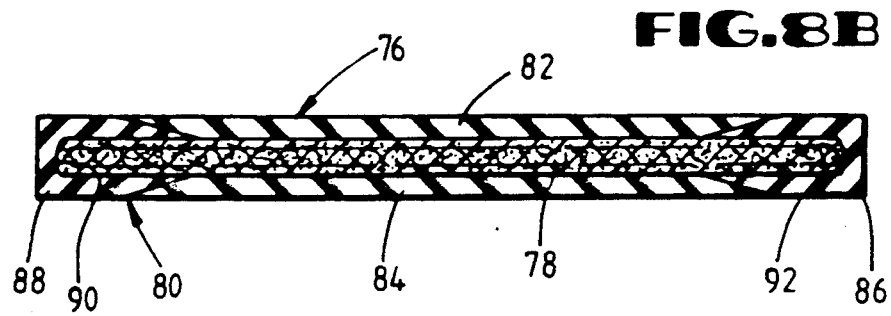
FIG. 8B is a cross-sectional view of the belt illustrated in FIG. 8A.

FIGS. 8A and 8B illustrate belting 76 in accordance with the present invention which comprises a preferred embodiment of the invention known as encapsulated belting. The belt core 78 may be the same as the belt core 62 in FIG. 7A, discussed above.

The belt core 78 of FIGS. 8A and 8B is subjected to a plying process which completely coats the belt core 78 with an encapsulating, outer cover 80 of the same or different elastomer used in plying the belt core 78. The outer cover 80 includes outer skims 82 and 84 and caps 86 and 88. In this embodiment the belt core's longitudinal edges 90 and 92 are buttressed by caps 86 and 88 comprising a harder elastomer than the elastomer used for the outer skims 82 and 84. As an example, if the hardness of the outer skims 82 and 84 is in the range of 55-70 Shore A, the hardness of the caps 86 and 88 should typically be about 70-80 Shore A. The result of applying these different elastomers is that the elasticity modulus of the belt-edge region covered by the harder elastomer becomes greater than the modulus of the longitudinal belt center.

It will be noted at this point that elastomers typically increase in cost as they increase in hardness. Thus, to attain the benefits of the invention, the embodiment of FIG. 8A is economically efficient typically for lighter load or lighter tensional applications. Economic efficiency for hay-baler applications that involve heavy loads and tensions is more easily reached with the embodiment shown in FIG. 9A, discussed below.

Figure 8C:
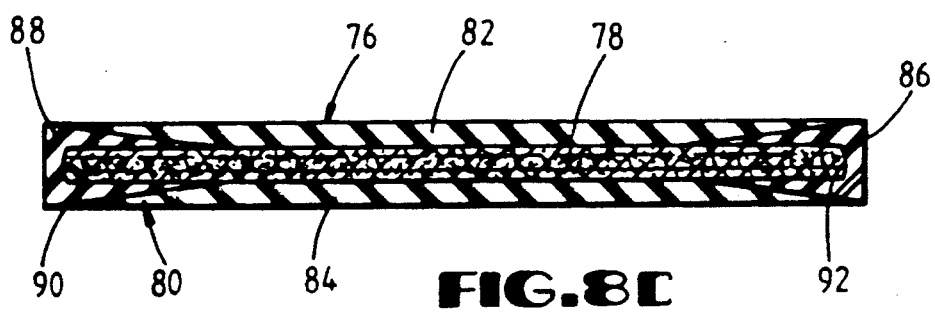
FIG. 8C is a cross-sectional view of an alternative form of the belt illustrated in FIG. 8A.

The caps 86 and 88 may be applied only to the very edge of the belt core 78; however, to enhance bonding of the different elastomers used in the caps 86 and 88 and skims 82 and 84, the elastomer of the caps should preferably extend in decreasing thickness toward the longitudinal center of the belt 76. Two alternative embodiments are illustrated in FIGS. 8B and 8C. Preferably, the elastomer of each cap should extend over about 30 percent of each opposing flat surface of the belt core 78. Furthermore, preferably up to about 70 percent of the belt 76 should have a lower modulus of elasticity to aid the hay baler in driving the belts.

The process of applying the outer cover 80 is preferably accomplished by crosshead extrusion, wherein the belt core 78 is passed through a multiscrew crosshead that is capable of extruding one elastomer on each longitudinal edge of the belt core 78 and another elastomer on the opposing surfaces of the belt core 78. It is important that the various elastomers be able to bond to all of the constituents of the belt core.

Figure 9A:
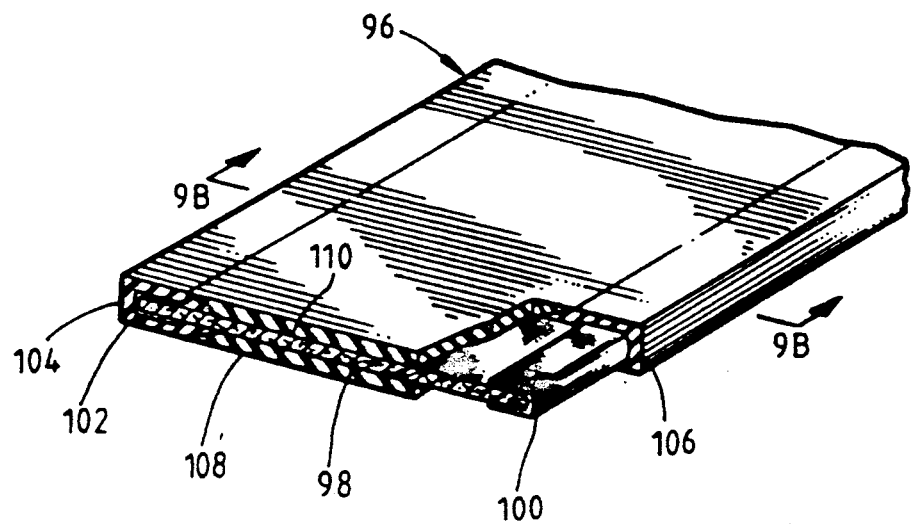
FIG. 9A is a perspective, sectional, partially cutaway view of encapsulated, edge-wrapped belting in accordance with the present invention.
Figure 9B:
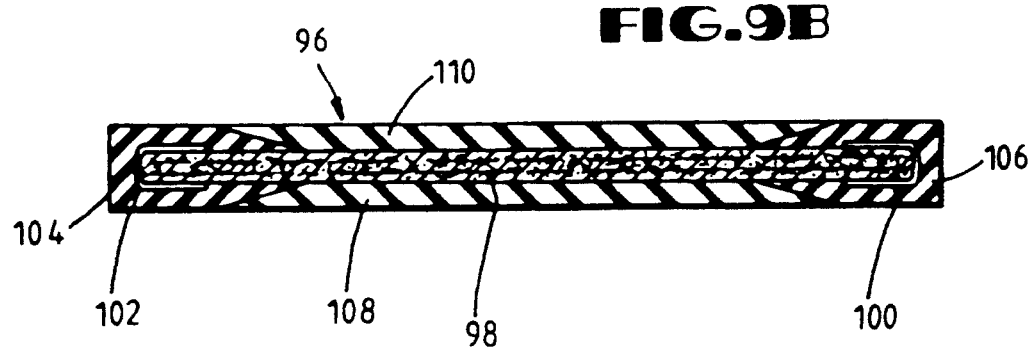
FIG. 9B is a cross-sectional view of the belt illustrated in FIG. 9A.

The belting 96 of FIGS. 9A and 9B combines the advantages of the wrapped belting of FIG. 7A and the advantages of the encapsulated belting of FIG. 8A. First, edge wraps 100 and 102 are applied to the belt core 98 as in the embodiment of FIG. 7A, discussed above. Then, caps 104 and 106 and outer skims 108 and 110 are applied to the belt core 98 and edge wraps 100 and 102 to form a complete encapsulation as described in the embodiment of FIG. 8A, discussed above. As discussed in reference to FIG. 8A, the hardness of the elastomer of caps 104 and 106 should be greater than the hardness of the elastomer of the outer skims 108 and 110.

As an example of a preferred embodiment, the belt core 98 comprises three fabric plies of woven Nylon and polyester fibers. The fabric plies are joined by an elastomer of thermoset, synthetic rubber. The edge wraps 100 and 102 comprise a Nylon fabric and are treated with an adhesive comprising a solvated natural rubber and an additive to give the rubber an adhesive quality. This additive is preferably Chemlok 402 made by Lord Corporation. Preferably, each edge wrap covers about 10 percent of each of the belt core's flat surfaces for a total coverage of 40 percent. The belt core 98 and edge wraps 100 and 102 are then preferably encapsulated by extruding two different elastomers on the edges of the belt and the opposing surfaces. This extrusion is preferably accomplished by a multiscrew crosshead. The elastomer of the outer skims 108 and 110 should preferably be in the range of 60–70 Shore A while the elastomer of the caps 104 and 106 should be about 80 Shore A. The elastomer is preferably thermoset synthetic rubber. The belts would typically be cured by vulcanization under a pressure of approximately 50 lbs./in.² or greater and at a temperature of approximately 280 degrees Fahrenheit for about 10 to 60 minutes.

I claim:

1. A method for making a multi-ply belt, comprising the steps of:
   coating a fabric sheet with an elastomeric material to form a coated fabric sheet, said coated fabric sheet having a first end portion and a second end portion;
   folding said coated fabric sheet onto itself a predetermined number of times along preselected imaginary lines to form a multi-ply belt having two longitudinal edges and two opposing surfaces, said preselected imaginary lines extending from said first end portion to said second end portion and dividing said coated fabric sheet into longitudinal portions;
   curing said multi-ply belt;
   constructing said first end portion and said second end portion of said coated fabric sheet at a predetermined angle with respect to said imaginary lines, so that said step of folding forms complementary end portions on said multi-ply belt; and
   complementarily joining said complementary end portions together to form a multi-ply splice.

2. The method of claim 1 further comprising an initial step of treating said fabric sheet with an adhesive.

3. The method of claim 1 wherein said step of coating comprises extruding said elastomeric material around said fabric sheet.

4. The method of claim 1 wherein said step of coating comprises crosshead extruding said elastomeric material around said fabric sheet.

5. The method of claim 1 wherein said step of coating comprises calendering a layer of said elastomeric material onto each side of said fabric sheet.

6. The method of claim 1 further comprising, after said folding step, the steps of:
   applying fabric strips along each said longitudinal edge and over a portion of each said opposing surface of said multi-ply belt; and
   extruding a second elastomeric material around said multi-ply belt.

7. The method of claim 6 wherein said extruding step comprises crosshead extruding.

8. The method of claim 1 wherein said step of curing comprises the step of vulcanizing said multi-ply belt.

9. The method of claim 8 wherein said step of vulcanizing comprises heating a section of said multi-ply belt to a temperature and for a time sufficient to cure said section.

10. The method of claim 9 wherein said heating step is repeated until all sections of said multi-ply belt are cured.

11. The method of claim 1 wherein said step of complementarily joining comprises the step of heat treating said complementary end portions when joined to form said endless belt.

12. The method of claim 1 wherein said predetermined angle is 45 degrees.

13. The method of claim 1 wherein said step of constructing said first end portion and said second end portion of said coated fabric sheet at a predetermined angle with respect to said imaginary lines comprises the step of cutting said first end portion and said second end portion of said coated fabric sheet at said predetermined angle prior to said step of folding.

14. A method for making a multi-ply belt, comprising the steps of:
   coating a fabric sheet with an elastomeric material to form a coated fabric sheet, said coated fabric sheet having a first end portion and a second end portion;
   longitudinally folding said coated fabric sheet onto itself a predetermined number of times to form a belt having multiple plies and at least one longitudinal edge;
   coupling said multiple plies together;
   constructing said first end portion and said second end portion of said coated fabric sheet at a predetermined angle with respect to said longitudinal edge, so that said step of longitudinally folding forms complementary end portions on said multi-ply belt; and
   complementarily joining said complementary end portions together to form a multi-ply splice.

15. A method for making a multi-ply belt comprising the steps of:
   coating a fabric sheet with an elastomeric material to form a coated fabric sheet, said coated fabric sheet having a first end portion and a second end portion;
   folding a first longitudinal edge portion of said coated fabric sheet onto a central portion of said coated fabric sheet along a first preselected imaginary line, said first preselected imaginary line extending from said first end portion to said second end portion and dividing said first longitudinal edge portion from said central portion;
   folding a second longitudinal edge portion of said coated fabric sheet onto said central portion of said coated fabric sheet along a second preselected imaginary line to form a three-ply belt having an S-shaped cross-section, said second preselected imaginary line extending from said first end portion to said second end portion and dividing said second longitudinal edge portion from said central portion;
   curing said three-ply belt; and
   joining said first and second end portions to one another so as to form an endless belt.

16. The method of claim 15 further comprising an initial step of treating said fabric sheet with an adhesive.

17. The method of claim 15 wherein said step of coating comprises extruding said elastomeric material onto said fabric sheet.

18. The method of claim 15 wherein said step of coating comprises crosshead extruding said elastomeric material around said fabric sheet.

19. The method of claim 15 wherein said step of coating comprises calendering a layer of said elastomeric material onto each side of said fabric sheet.

20. The method of claim 15 wherein said step of curing comprises vulcanizing said three-ply belt.

21. The method of claim 20 wherein said step of vulcanizing comprises heating a section of said three-ply belt to a temperature and for a time sufficient to cure said section.

22. The method of claim 21 wherein said heating step is repeated until all sections of said three-ply belt are cured.

23. The method of claim 15 wherein said step of joining said first and second end portions further comprises the steps of:
constructing said first end portion and said second end portion of said coated fabric sheet at a predetermined angle with respect to said imaginary lines, so that said steps of folding form complementary end portions on said three-ply belt; and
complementarily joining said complementary end portions together to form a three-ply splice.

24. The method of claim 23 wherein said predetermined angle is 45 degrees.

25. The method of claim 23 wherein said step of constructing said first end portion and said second end portion of said coated fabric sheet at a predetermined angle with respect to said imaginary lines comprises the step of cutting said first end portion and said second end portion of said coated fabric sheet at said predetermined angle prior to said steps of folding.

26. The method of claim 23 wherein said step of complementarily joining comprises the step of heat treating said complementary end portions when joined to form said endless belt.

27. A method for making a multi-ply belt, comprising the steps of:
coating a fabric sheet with an elastomeric material to form a coated fabric sheet, said coated fabric sheet having a first end portion and a second end portion;
folding a first longitudinal edge portion of said coated fabric sheet onto a central portion of said coated fabric sheet along a first preselected imaginary line, said first preselected imaginary line extending from said first end portion to said second end portion and dividing said first longitudinal edge portion from said central portion;
folding a second longitudinal edge portion of said coated fabric sheet onto said first longitudinal edge portion of said coated fabric sheet along a second preselected imaginary line to form a three-ply belt having a G-shaped cross-section, said second preselected imaginary line extending from said first end portion to said second end portion and dividing said second longitudinal edge portion from said central portion;
curing said three-ply belt;
constructing said first end portion and said second end portion of said coated fabric sheet at a predetermined angle with respect to said imaginary lines, so that said steps of folding form complementary end portions on said three-ply belt; and
complementarily joining said complementary end portions together to form a three-ply splice.

28. The method of claim 27 further comprising an initial step of treating said fabric sheet with an adhesive.

29. The method of claim 27 wherein said step of coating comprises extruding said elastomeric material around said fabric sheet.

30. The method of claim 27 wherein said step of coating comprises crosshead extruding said elastomeric material around said fabric sheet.

31. The method of claim 27 wherein said step of coating comprises calendering a layer of said elastomeric material onto each side of said fabric sheet.

32. The method of claim 27 wherein said step of curing comprises vulcanizing said three-ply belt.

33. The method of claim 32 wherein said step of vulcanizing comprises heating a section of said three-ply belt to a temperature and for a time sufficient to cure said section.

34. The method of claim 33 wherein said heating step is repeated until all sections of said three-ply belt are cured.

35. The method of claim 27 wherein said step of complementarily joining comprises the step of heat treating said complementary end portions when joined to form said endless belt.

36. The method of claim 27 wherein said predetermined angle is 45 degrees.

37. The method of claim 27 wherein said step of constructing said first end portion and said second end portion of said coated fabric sheet at a predetermined angle with respect to said imaginary lines comprises the step of cutting said first end portion and said second end portion of said coated fabric sheet at said predetermined angle prior to said steps of folding.

38. A method for making a belt comprising the steps of:
providing a belt core with a first elastomer and having two opposing surfaces and two opposing longitudinal edges;
applying fabric strips to said longitudinal edges and to a portion of each said opposing surface;
coating said belt core and fabric strips with an elastomeric cover to form a belt; and
curing said belt.

39. The method of claim 38 wherein said coating step comprises crosshead extruding said elastomeric cover around said belt core and fabric strips.

40. The method of claim 39, wherein said fabric strips cover up to about 40 percent of said belt core.

41. The method of claim 3 wherein said curing step comprises vulcanizing the belt.

42. The method of claim 41 wherein said curing step comprises heating a section of said belt to a temperature and for a time sufficient to cure said section.

43. The method of claim 42 wherein said heating step is repeated until all sections of said belt are cured.

44. The method of claim 38 wherein said coating step comprises extruding said elastomeric cover around said belt core and fabric strips.

45. The method of claim 44 wherein said curing step comprises vulcanizing the belt.

46. The method of claim 38 further comprising the step of initially treating said fabric strips with an adhesive.

47. The method of claim 46 wherein said coating step comprises crosshead extruding said elastomeric cover around said belt core and fabric strips.

48. The method of claim 47 wherein said curing step comprises vulcanizing the belt.

49. The method of claim 46 further comprising the step of applying said fabric strips to said belt core by direct pressure.

50. The method of claim 46 wherein said coating step comprises extruding said elastomeric cover on to said belt core and fabric strips.

51. A method for making a belt comprising:

providing a belt core having one or more plies, two opposing surfaces and two opposing longitudinal edges;

applying a fabric strip around each said longitudinal edge and to a first adjoining portion of each said opposing surface;

coating a first elastomer on each said longitudinal edge and on a second adjoining portion of each said opposing surface;

coating a second elastomer on said opposing surfaces between said second adjoining portions, to form a belt; said second elastomer being less hard than said first elastomer; and curing said belt.

52. The method of claim 51 wherein said steps of coating said first and second elastomers comprise crosshead extruding said first and said second elastomers onto said belt core.

53. The method of claim 52 wherein said curing step comprises vulcanizing the belt.

54. The method of claim 51 wherein said fabric strips cover up to about 40 percent of said belt core.

55. The method of claim 51 wherein said curing step comprises vulcanizing the belt.

56. The method of claim 51 wherein said steps of coating said first and second elastomers comprise extruding said first and said second elastomers on said belt core.

57. The method of claim 56 wherein said fabric strips cover up to about 40 percent of said belt core.

58. A method for making a belt comprising the steps of:

providing a belt core having one or more plies, two opposing surfaces, and two opposing longitudinal edges;

extruding a first elastomer onto said opposing surfaces;

extruding a second elastomer having a hardness greater than the hardness of said first elastomer onto said longitudinal edges of said belt core to form a belt; and curing said belt.

59. The method of claim 58 wherein said steps of extruding said first and second elastomer comprise crosshead extruding.

60. The method of claim 58 further comprising applying separate fabric strips along each said longitudinal edge of said belt core and along adjoining portions of said opposing surfaces.

61. The method of claim 60 wherein said fabric strips cover up to about 40 percent of said belt core.

62. The method of claim 61 further comprising applying an adhesive to said fabric strips.

* * * * *

UNITED STATES PATENT AND TRADEMARK OFFICE
CERTIFICATE OF CORRECTION

PATENT NO. : 5,326,411
DATED : July 5, 1994
INVENTOR(S) : D. Brink Arnold

It is certified that error appears in the above-indentified patent and that said Letters Patent is hereby corrected as shown below:

Column 14, claim 41, line 42, "3" should read --38--.

Signed and Sealed this

Twentieth Day of September, 1994

Attest:

BRUCE LEHMAN

Attesting Officer

Commissioner of Patents and Trademarks